United States Patent [19]

Brodeur

[11] Patent Number: 4,468,668

[45] Date of Patent: Aug. 28, 1984

[54] METHOD FOR PROCESSING SIGNALS IN A NAVIGATION RECEIVER

[75] Inventor: Lester R. Brodeur, Nashua, N.H.

[73] Assignee: Sanders Associates, Inc., Nashua, N.H.

[21] Appl. No.: 289,842

[22] Filed: Aug. 3, 1981

[51] Int. Cl.³ .............................................. G01S 1/24
[52] U.S. Cl. .................................... 343/389; 364/452
[58] Field of Search ...................... 343/388, 389, 392; 364/452

[56] References Cited

U.S. PATENT DOCUMENTS 3,868,691  2/1975  Miller et al. ....................... 364/452

Primary Examiner—Theodore M. Blum
Attorney, Agent, or Firm—Louis Etlinger; William F. Porter, Jr.

[57] ABSTRACT

A method for processing navigation signals received by a LORAN-C receiver to lessen the effects of noise on the navigation data provided to the receiver user. Time of signal arrival information measured by the receiver is modified depending on the signal-to-noise environment to remove extreme time of signal arrival deviations that are obviously erroneous. The modified information is then averaged to more accurately determine the true time of signal arrival and thereby provide more stable and accurate navigation data.

7 Claims, 14 Drawing Figures

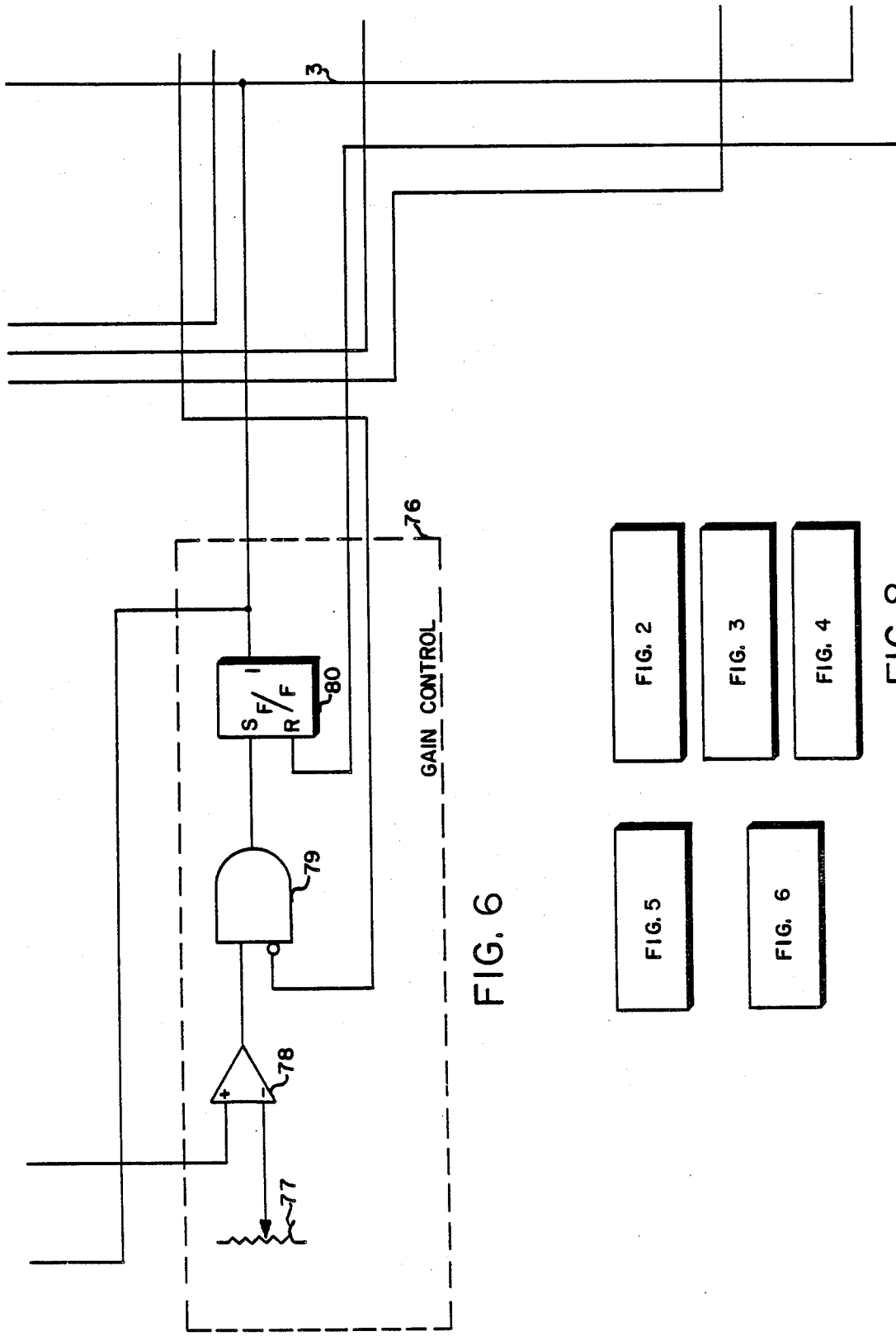

METHOD FOR PROCESSING SIGNALS IN A NAVIGATION RECEIVER

FIELD OF THE INVENTION

This invention relates to navigational equipment and more particularly to hyperbolic navigational equipment utilizing the time difference in the propagation of radio frequency pulses from synchronized ground transmitting stations.

BACKGROUND OF THE INVENTION

Throughout maritime history navigators have sought an accurate, reliable method of determining their position on the surface of the earth and many instruments such as the sextant were devised. During the second World War, a long range radio navigation system, LORAN-A, was developed and implemented under the auspices of the United States Coast Guard to fulfill wartime operational needs. At the end of the war there were seventy LORAN-A transmitting stations in existence and all commercial ships, having been equipped with LORAN-A receivers for wartime service, continued to use this navigational system. This navigational system served its purpose but shortcomings therein were overcome by a new navigational system called LORAN-C.

Presently, there are eight LORAN-C multi-station transmitting chains in operation. This new navigational system will result in an eventual phase-out of the earlier LORAN-A navigational system.

LORAN-C is a pulsed, low-frequency (100 kilohertz), hyperbolic radio navigation system. LORAN-C radio navigation systems employ three or more synchronized ground stations that each transmit radio pulse chains having, at their respective start of transmissions, a fixed time relation to each other. The first station to transmit is referred to as the master station while the other stations are referred to as the secondary stations. The pulse chains are radiated to receiving equipment that is generally located on aircraft or ships whose positions are to be accurately determined. The pulse chains transmitted by each of the master and secondary stations is a series of pulses wherein each pulse has an exact envelope shape, each pulse chain is transmitted at a constant precise repetition rate, and each pulse is separated in time from a subsequent pulse by a precise fixed time interval. In addition, the secondary station pulse chain transmissions are delayed a sufficient amount of time after the master station pulse train transmissions to assure that their time of arrival at receiving equipment anywhere within the operational area of the particular LORAN-C system will follow receipt of the pulse chain from the master station.

Since the series of pulses transmitted by the master and secondary stations is in the form of pulses of electromagnetic energy which are propagated at a constant velocity, the difference in time of arrival of pulses from a master and a secondary station represents the difference in the length of the transmission paths from these stations to the LORAN-C receiving equipment.

The focus of all points on a LORAN-C chart representing a constant difference in distance from a master and a secondary station, and indicated by a fixed time difference of arrival of their 100 kilohertz carrier pulse chains, describes a hyperbola. The LORAN-C navigation system makes it possible for a navigator to exploit this hyperbolic relationship and precisely determine his position using a LORAN-C chart. By using a moderately low frequency such as 100 kilohertz, which is characterized by low attentuation, and by measuring the time difference between the reception of the signals from master and secondary stations, the modern day LORAN-C system provides equipment position location accurate within two hundred feet and with a repeatability of within fifty feet.

The theory and operation of the LORAN-C radio navigation system is described in greater detail in an article by W. P. Frantz, W. Dean, and R. L. Frank entitled "A Precision Multi-Purpose Radio Navigation System," 1957 I.R.E. Convention Record, Part 8, page 79. The theory and operation of the LORAN-C radio navigation system is also described in a pamphlet put out by the Department of Transportation, United States Coast Guard, Number CG-462, dated August, 1974, and entitled "LORAN-C User Handbook."

The signals presently received by LORAN-C navigation receivers have very low signal-to-noise ratios and it is difficult to locate the third cycle positive zero crossing conventionally used in making the time difference measurements between signals received from the master and secondary stations.

Automatic LORAN-C receivers presently acquire or locate signals being received from the master and secondary stations of a selected LORAN-C transmitter chain and then go into a tracking mode wherein they calculate the time of arrival of future received signals. More particularly, the receiver calculates the time interval between the receipt of the master station signal and each of the associated secondary stations and then within relatively narrow time windows it looks for the signals from each of the secondary stations. As a result of noise, the measured time of reception of each secondary station signal varies within the time window in which it is received and may be represented by a bell shaped distribution curve. The peak part of the distribution curve represents the true time of arrival of the secondary station signal. As the signal-to-noise ratio decreases, the distribution curve representing signals received over some finite period of time becomes broader and the central peak is less pronounced in a manner well understood in the art.

On the LORAN-C receiver the position display is affected by received noise. In a very good signal-to-noise environment the position display is stable and provides accurate navigation information. However, as the signal-to-noise ratio of the received signals decreases, even to those levels normally encountered in operation, the least significant digit on the LORAN-C receiver display begins "jump around" and cannot be relied upon. This decreases the accuracy of the navigation information provided via the display.

To overcome this problem prior art LORAN-C receivers set the time constant of their tracking servos to in the order of twenty seconds. This is a compromise figure which normally provides acceptable operation on relatively slow speed craft such as boats, but as the signal-to-noise ratio decreases further, the navigation information output again becomes unreliable. The time constant of the receiver tracking servos cannot be increased further or the receiver will lose track of the master and secondary stations fairly easily and must reacquire or relocate them. In addition, such prior art LORAN-C receivers having tracking servo time constants of twenty seconds cannot be used on high speed craft such as airplanes for they easily lose track of the LORAN-C transmitter signals. Having a relatively long servo time constant such as twenty seconds also means that when the receiver is turned on it takes twenty seconds or more to provide navigation information to the receiver operator.

In a good operating environment a LORAN-C receiver can tell the position of the receiver within about fifty feet, but with the unreliability of the least significant display digit in poor operating environments the level of accuracy is reduced to about twenty-five hundred feet. This increased inaccuracy has long been a problem in the prior art when signal-to-noise ratio is below a certain level.

The foregoing problem in the prior art, is satisfied by my novel method for making corrections to the measured time delays between receipt of master and secondary station signals to remove the effects of noise before the measured time delays are integrated and used to provide navigation information. The effect is to decrease the signal of the bell-shaped distribution curve of measured time delays over a finite period. The end result is to shorten the time constant in the servo tracking loop in the LORAN-C receiver while at the same time increasing reliability of the displayed navigation information in significantly lower signal-to-noise ratio operating environments than has heretofore been possible in the art. In addition, the receiver utilizing my novel method may also be used on higher speed craft.

The present invention will be better understood upon a review of the description given hereinafter in conjunction with the drawings in which:

BRIEF DESCRIPTION OF THE DRAWINGS

FIGS. 2, 3, 4, 5 and 6 are detailed block diagrams of a LORAN-C receiver including the present invention;

FIG. 8 shows the manner in which FIGS. 2, 3, 4, 5 and 6 should be arranged with respect to each other when reading the detailed description;

In FIG. 1 is seen a general blocking diagram of my novel LORAN-C navigation equipment. Filter and preamplifier 1 and antenna 2 are of a conventional design of the type used in all LORAN-C receivers and is permanently tuned to a center frequency of 100 KHz, which is the operating frequency of all LORAN-C transmitting stations. Filter 1 has a bandpass of 20 KHz. Received signals are applied via inverting amplifier 81 to cycle detector 82 and to zero crossing detector 6.

Figure 1:
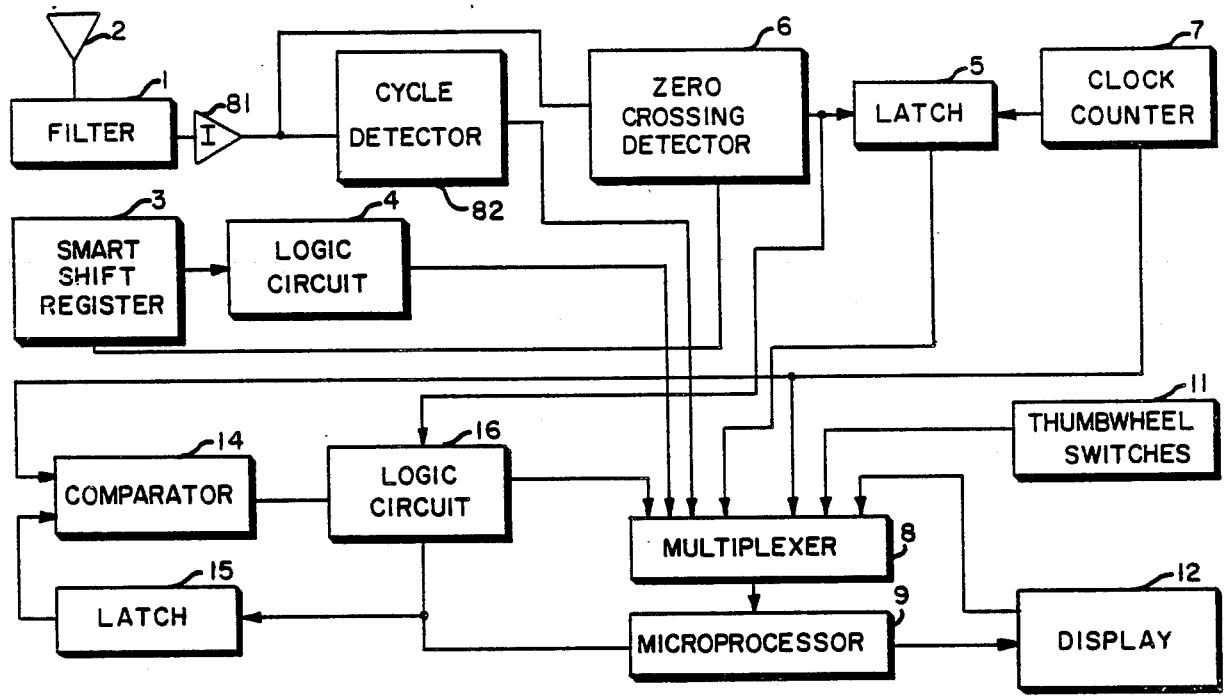
FIG. 1 is a general block diagram of a LORAN-C receiver.

The signal input to zero crossing detector 6 is first amplitude limited so that each cycle of each pulse is represented by a binary one and each negative half cycle is represented by a binary zero. The leading or positive edge of each binary one exactly corresponds to the positive slope of each sine wave comprising each pulse. Thus, detector 6 is a positive zero crossing detector. As will be described in detail further in this specification, logic circuit 16 also provides an input to zero crossing detector 6, not shown in FIG. 1, which sets a 10 microsecond window only within which the leading edge of each binary 1 may be detected. The end result is that only the positive zero crossing of the third cycle of each pulse of the pulse trains transmitted by each LORAN-C station is detected and an output is provided by detector 6.

It can be seen that latch 5 has its input from zero crossing detector 6. Clock/counter 7 is a crystal controlled clock which is running continuously while my novel LORAN-C receiver is in operation. The count present in counter 7 at the moment that zero crossing detector 6 indicates a third cycle positive zero crossing is stored in latch 5, the contents of which are then applied to multiplexer 8. Multiplexer 8 is a time division multiplexer used to multiplex the many leads from logic circuit 16, logic circuit 4, cycle detector 82, latch 5, clock/counter 7, and thumbwheel switches 11 and 12, through to microprocessor 9. The count in latch 5 indicates to microprocessor 9 the time at which each positive zero crossing is detected.

The signal input to smart shift register 3 from detector 6 is a pulse train of 1's and 0's which is shifted through the shift register digital delay line which is tapped at 1 millisecond intervals. Because of the logic circuits connected to each tap thereof, only the pulse trains from LORAN-C master and secondary stations will result in outputs from the logic circuits of register 3. The logic circuits within register 3 are used to analyze the contents of the shift register delay line to first determine if the signals represent a pulse train from a LORAN-C master or secondary station, and secondly to indicate the particular phase coding of the signals being received. Logic circuit 4 stores information from register 3 indicating whether a pulse train is from a master or a secondary station and further indicating the particular phase code transmitted. This information stored within logic circuit 4 is applied to microprocessor 9 via multiplexer 8 for use in processing received LORAN-C signals. At the same time that information is stored within logic circuit 4, detector 6 causes latch 5 to store the present count in clock/counter 7 which indicates the time of occurrence. It should be noted that clock/counter 7 also has an input to multiplexer 8 so that microprocessor 9 can keep track of continuous running time as indicated by recycles of counter 7.

Thumbwheel switches 11 are used to input the GRI of a selected LORAN-C chain to the receiver. The output of thumbwheel switches 11 are also input to multiplexer 8 to apply the GRI of the selected LORAN-C chain to microprocessor 9.

With the various types of information being input to microprocessor 9 via multiplexer 8 from the circuits previously described, microprocessor 9 determines when received signals are from the master and secondary stations of the selected LORAN-C chain. Once microprocessor 9 closely locates the signals from the selected master station, as determined by a match of the GRI number input thereto via thumbwheel switches 11 with the difference in time of receiving each pulse train transmitted by the master station of the selected chain, the receiver goes into a fine search mode utilizing a phase-lock-loop implemented with a computer program in microprocessor 9 and the loop being closed by an input from cycle detector 82 to locate the desired radio frequency carrier third cycle positive zero crossing in conjunction with zero crossing detector 6. The receiver then switches to locate the secondary station signals of the selected chain. To locate the secondary stations microprocessor 9 creates first a coarse histogram and then a fine histogram by storing the time of receiving all secondary station signals in time slot bins created by the microprocessor in its own memory between the arrival of any two consecutive master station pulse trains. When signals from the secondary stations of the selected LORAN-C chain are located by secondary station signal counts appearing in the coarse histogram time slot bins at the same rate as the GRI of the selected LORAN-C chain, the microprocessor 9 creates a fine histogram having time slot bins of shorter time duration. In this manner, microprocessor 9 closely determines the time of arrival of pulse trains from the secondary stations of the selected LORAN-C chain.

Once microprocessor 9 closely determines the time of receiving secondary station signals and can calculate the time of receipt of subsequently received secondary station pulse trains, the microprocessor causes the receiver to go into a fine search mode utilizing the same phase-locked-loop arrangement generally described above to accurately locate the third cycle positive zero crossing of each pulse of the secondary station pulse trains.

Again, control circuit 76 is provided to monitor the level of the received radio frequency signal and automatically adjust the gain of inverting amplifier 81. Logic circuit 16 also controls the inverting operation of amplifier 81 to periodically switch the phase of signals applied via amplifier 81 to the remainder of the receiver circuitry to remove the effects of noise internal to the receiver.

Once microprocessor 9 functioning with the other circuits in my LORAN-C receiver has located and locked onto the pulse trains being transmitted by the master and secondary stations of the selected LORAN-C chain, it is in a tracking mode wherein it makes the desired time difference of arrival measurements that are required in LORAN-C operation.

Figure 10:
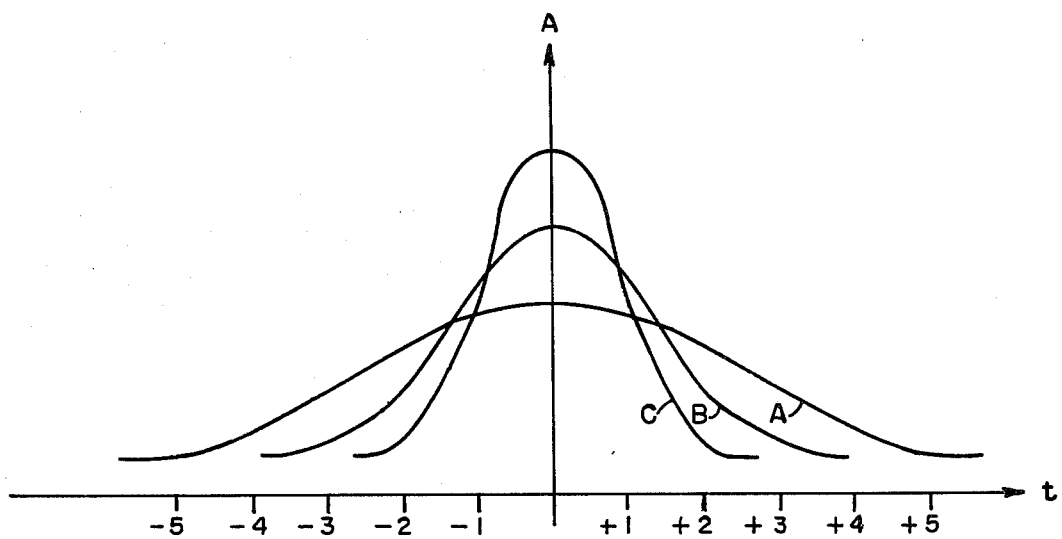
FIG. 10 shows bell shaped distribution curves useful in understanding the present invention.

In the tracking mode the receiver uses the third cycle positive zero crossing of each pulse of the pulse trains from the master and secondary transmitting stations to measure the interval or time delay between receipt of signals from the master station and each secondary station as is known in the art. Also known in the art is the fact that received noise causes the measured interval or time delay between the master station and each secondary station to vary around the true value of the time of reception. A well-known statistical representation of this phenomenon is a bell-shaped distribution curve, such as shown in FIG. 10, with the peak of the curve being the true value of the time delay or interval between receipt of master and secondary station signals. As the signal-to-noise ratio decreases, measured time intervals are more often not equal to the actual time interval. These erroneous time interval measurements are input to a second order tracking loop in the receiver which integrates the interval measurements over approximately twenty seconds to provide an accurate and stable output reading to the receiver operator. However, as signal-to-noise ratio decreases to a certain point, this twenty second time constant of the tracking servo is not long enough and the least significant digit of the time interval information output to the receiver operator keeps changing thereby significantly decreasing the reliability of the output reading. This causes position accuracy to degrade from fifty foot accuracy to twenty-five hundred foot accuracy which may not be acceptable on a boat navigating in a narrow channel in thick fog for example.

To overcome this shortcoming the measured time delays are modified based on the signal-to-noise ratio at that time and the modified time delay information is then input to the tracking servo. Microprocessor 9 makes a simple signal-to-noise ratio measurement from signals being received and from this determines the degree of modification to be made to the measured time intervals. The effect of the modifications is to add or subtract, as appropriate, an increment of time to the measured time intervals to "push" them toward the "actual" time interval. The result is to decrease the signal of the distribution curve over a sampling of the measured time intervals before being input to the tracking servo to be integrated and provide a navigation information output.

The basis for this invention is the assumption that more is known of the signal being received than is obtained from each time interval measurement. The time of arrival of a secondary station signal is calculated very closely when the receiver has locked on and is in the tracking mode. The actual time of signal arrival should be fairly close to this and significant deviations are obviously and actually erroneous. Accordingly, time increments are algebraically added to each measured time interval to "push" it closer to the calculated time of signal arrival before being input to the tracking servo of the receiver to be processed and provide position information.

Further, utilizing this method the time constant of the tracking servo, which is the circuitry of the receiver, doesn't need to be long, in the order of twenty seconds, to provide steady and reliable position information. Instead the tracking servo time constant is variable and operates with a value of five seconds when prior art receivers must operate with a value of twenty seconds. This allows the receiver operating with my novel method to operate on higher speed craft, such as aircraft without losing track, yet provide reliable position information. As the signal-to-noise environment becomes very bad, to a level in which most prior art LORAN-C receivers cannot operate, the tracking servo time constant is changed to continue providing reliable position information with an accuracy of within fifty feet. The time constant may be changed smoothly, between five seconds and twenty seconds or in one or more incremental steps, depending only on received noise. When the signal-to-noise ratio is high, the servo time constant is at its shortest and vice versa.

Microprocessor 9 causes a visual indication of position information to be given via display 12. The output information is plotted on a LORAN-C hydrographic chart in a well known manner to locate the physical position of the LORAN-C receiver. There are lamps 70 through 75 on the front panel of the receiver which initially all flash on and off when the receiver is first turned on. As the signals of the master and each secondary station of the selected LORAN-C chain are located and it is determined by microprocessor 9 that each station's signals can be utilized to make accurate time difference of signal arrival measurements, the lamp associated with that station is changed to be lit steady. This gives an indication to the receiver operator of the confidence he may have in selecting stations with switches 11 to make time difference of signal arrival measurements.

In FIGS. 2, 3, 4, 5 and 6 is shown a detailed block diagram schematic of my novel LORAN-C receiver which will now be described in detail. FIGS. 2, 3, 4, 5 and 6 should be arranged as shown in FIG. 8 to best understand the description found hereinafter.

LORAN-C signals are received via antenna 2 and preamplifier 1 in a manner well-known in the art. Interference caused by miscellaneous radio frequency signals and signals from other navigational systems are essentially eliminated by filter 1 which utilizes filters having a 20 KHz bandwidth centered on 100 KHz with a sharp drop-off at either side of this band. Filter 1 is of a conventional design and is not described in further detail herein. Similarly, the choice of antenna 2 and/or the design thereof is also well-known in the art. The output from filter 1 is the undemodulated 100 KHz radio frequency signal and is applied to inverting amplifier 81.

When my novel LORAN-C equipment is initially placed in operation, it is in a coarse search mode wherein it is only trying to generally locate the pulse trains from the master and secondary stations of the selected chain. This function is accomplished by smart shift register 3 as now described. Limiter 17 in detector 6 hard limits the radio frequency signals input thereto from amplifier 81 so that only a chain of binary 1's is output from the limiter and input to register 3. Each of the binary 1's output from limiter 17 corresponds either to a spurious signal pulse or to each cycle of each pulse in the pulse trains from the master and secondary stations. These pulses are applied to smart shift register 3 which is shown in block diagram form in FIG. 2, but is shown in detail in FIG. 7 and will be described in detail further in this specification.

Smart shift register 3 is made up of a number of serially connected shift registers operating as a delay line. These shift registers store a window time sample of all received signals which are analyzed by logic circuits to determine if the signal stored in the shift registers represents a pulse train from a LORAN-C master or secondary station. Due to the clocking or shifting of register 3, the sample moves in time corresponding to the time rate of LORAN-C signals. The logic gates connected to various stages of shift registers are used to analyze the signals stored in the register at any point in time to determine if the stored signal is from a master or secondary station and to determine if the received signals have what is referred to as A or B phase coding. These phase codes are well-known to those skilled in the art. Upon smart shift register 3 determining that a pulse train has been received from a master or secondary station, the internal logic gates, which are described in greater detail further in the specification, apply an output signal on one of leads MA, MB, SA, or SB, indicating if the signal is from a master or secondary station and the particular phase coding thereof. The signal indication is stored in latch 21 which is connected to an input of multiplexer 8. In addition, the last named signal output from register 3 is applied via OR gate 22 and AND gate 98 to the SET input of flip-flop 23 to place this flip-flop in its set state with its 1 output high. The 1 output of R/S flip-flop 23 is applied via OR gate 24 to clocking input CK of latch 5. This causes latch 5 to store the contents of binary counter 26 in clock/counter 7 at the moment in time that it is determined that signals have been received from a master or secondary station. The contents stored in latch 5 are applied to multiplexer 8 to be input to microprocessor 9 and used in locating signals from the selected master and secondary stations.

Figure 7:
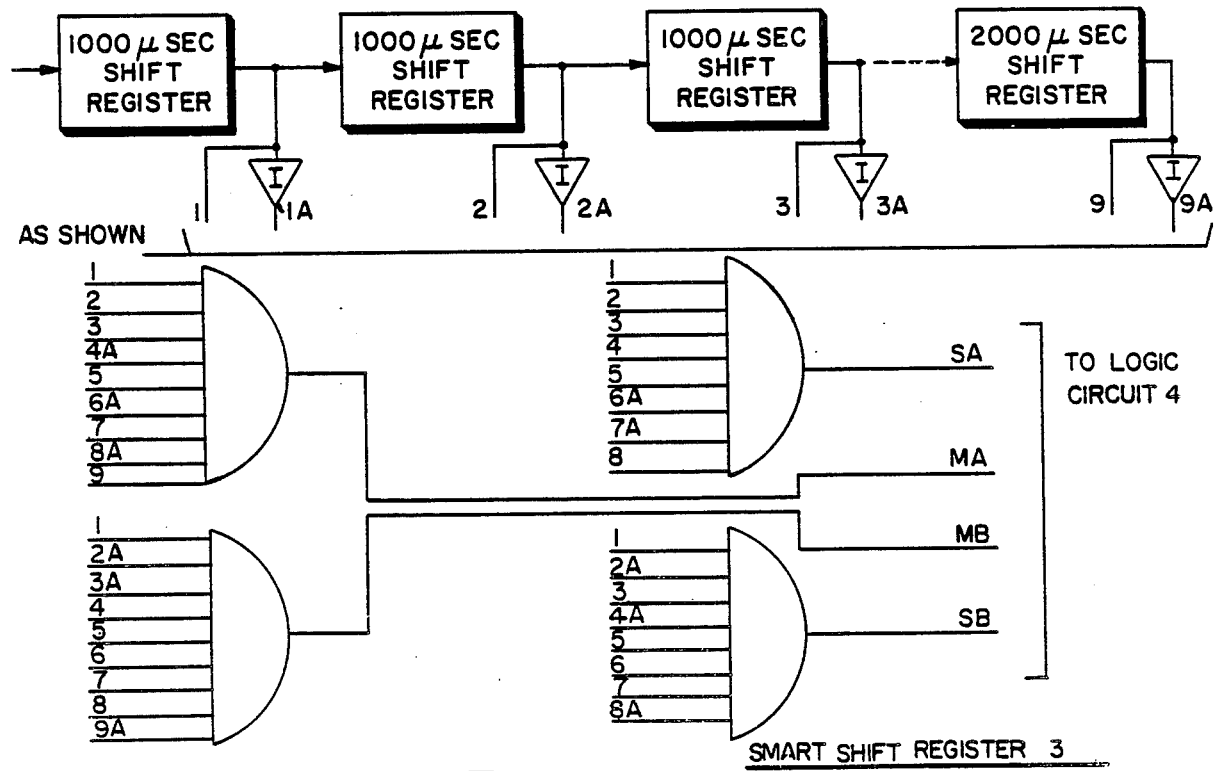
FIG. 7 is a detailed block diagram of the smart shift register shown in FIG. 2.
Figure 3:
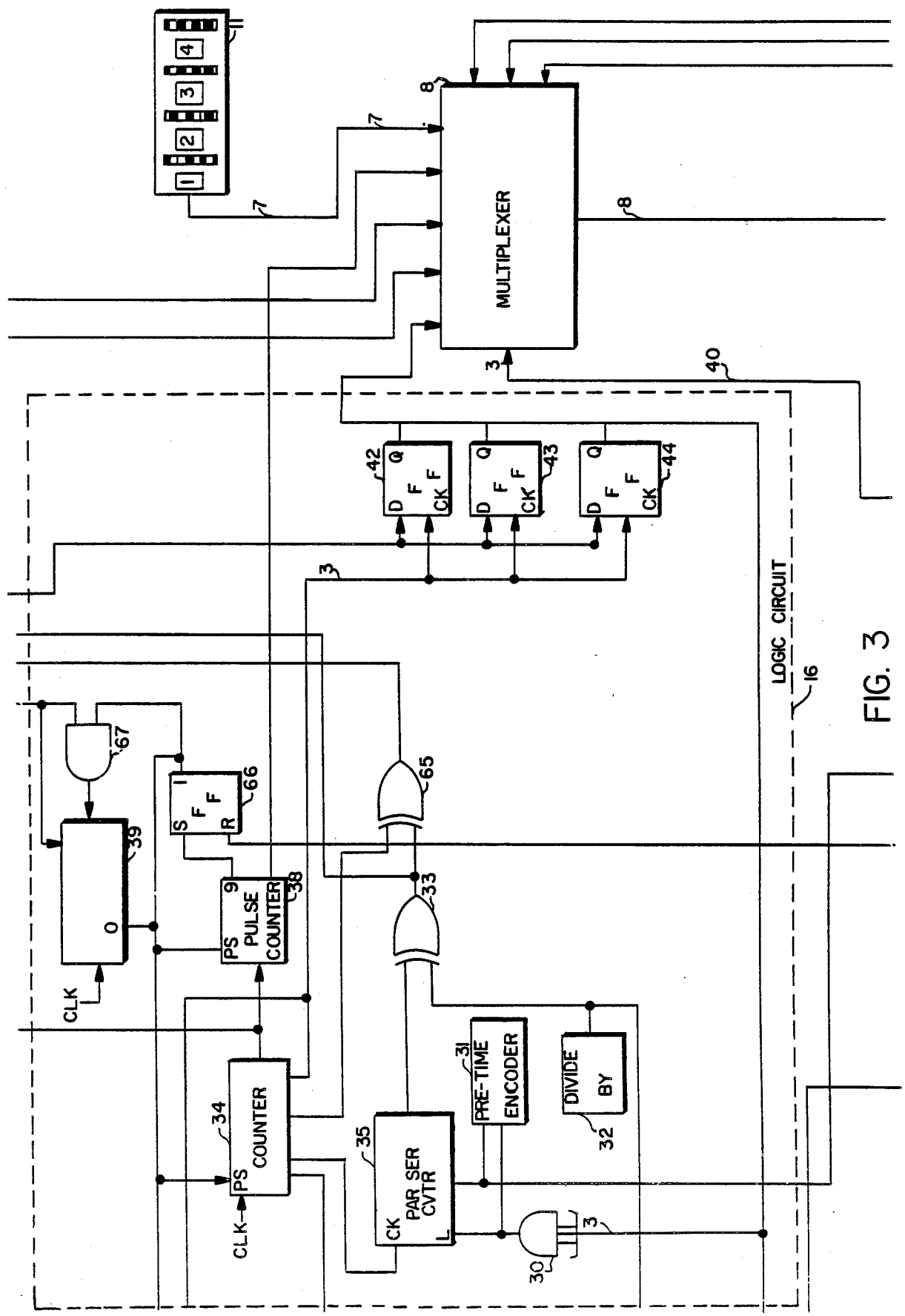
Figure 4:
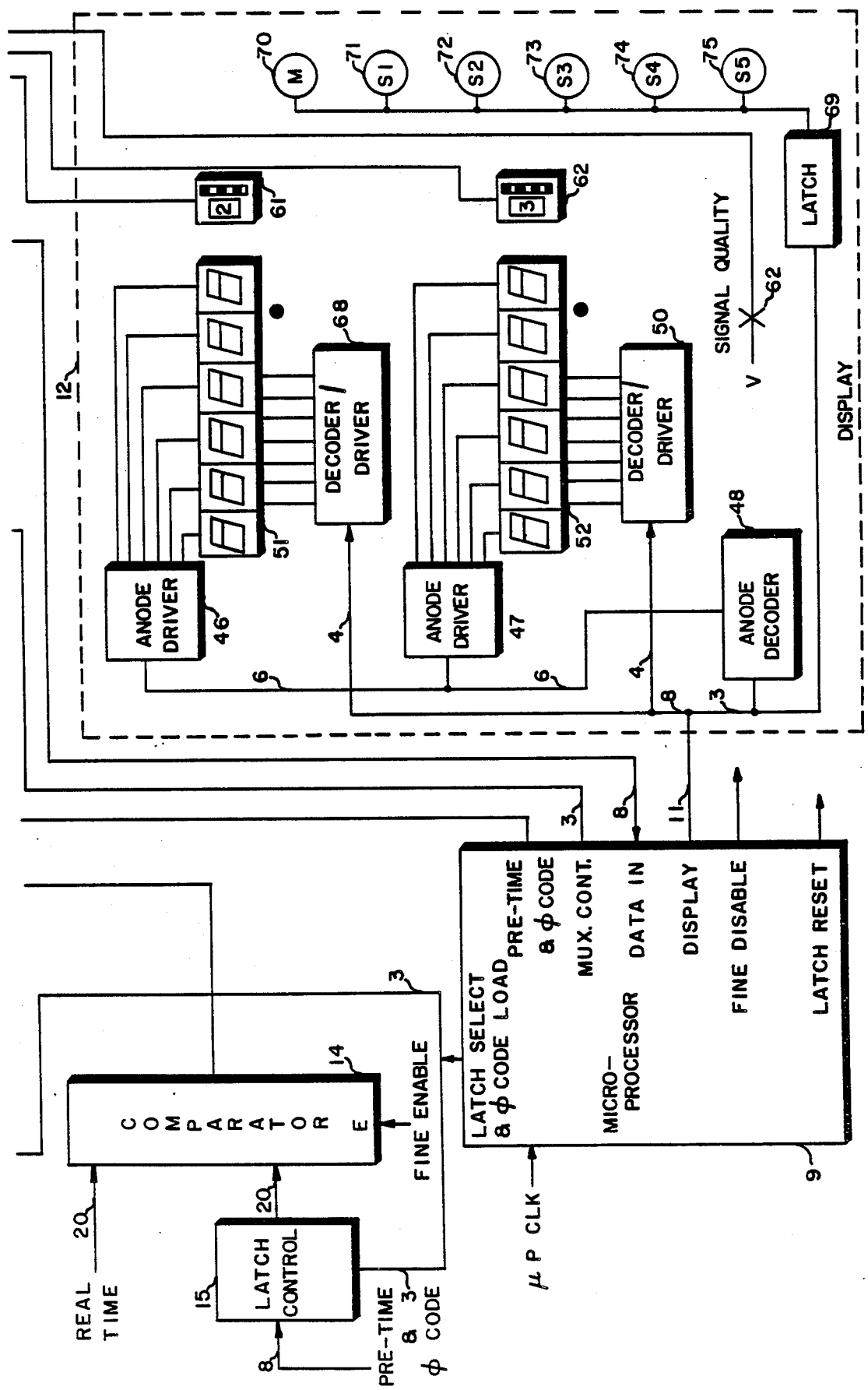

Multiplexer 8 in FIG. 3 is required to input signals to microprocessor 9 in FIG. 7 due to the limited number of input terminals to microprocessor 9 and the large number of leads having signals which must be applied to the microprocessor. Multiplexer 8 accomplishes this task utilizing time division multiplexing techniques. The signals input to multiplexer 8 from microprocessor 9 on leads 40 are used to control the operation of multiplexer 8.

Following microprocessor 9 receiving the contents of latch 5 via multiplexer 8 which indicates the time of receipt of a pulse train from a master or a secondary station, the microprocessor outputs a signal on LATCH RESET which is applied to latches 21 and 5 to clear the information stored therein in preparation of storing a subsequent clock count indicating receipt of a master or secondary station signal. In addition, the LATCH RESET is used to return flip-flop 23 to its reset state.

As clock signals input to microprocessor 9 represent the receipt of master and secondary station signals from more than one LORAN-C station chain, microprocessor 9 requires an input from the equipment operator using thumbwheel switches 11 to indicate a particular LORAN-C chain of interest by entering the group repetition interval (GRI) for the LORAN-C station chain of interest via switches 11.

Microprocessor 9 is working in a coarse search mode at this point in operation of the receiver and stores the time of receipt of all master station signals which are compared to the GRI to identify which master station signals are from the selected LORAN-C chain. With the stored time information for the desired master station, microprocessor 9 can calculate the future time of receipt of signals from that master station. When the desired master station signals are being received at the calculated times, microprocessor 9 causes the receiver circuitry to go into a fine search mode utilizing a phase-locked-loop technique employing a computer program and the loop is closed by cycle detector 82 and circuitry including logic circuit 16 and zero crossing detector 6.

In the fine search mode of operation which is the same for master and secondary stations, but is now described only for receipt of the master station signal, microprocessor 9 calculates a time 955 microseconds before the time of receipt of the next master station pulse train. This calculated time, called pretime, is output from microprocessor 9 on its Pre-Time and $\emptyset$ Code output and applied to the input of latch control 15. Microprocessor 9 also energizes its LATCH SELECT output to enable latch 15 to store the pretime present at its input. In addition, microprocessor 9 applies the phase code of the next received master signal to parallel to serial converter and energizes its load input to place the phase code in converter 35. In the fine search mode comparator 14 is enabled to compare the pretime stored in latch 15 with the Real Time count which is output from binary counter 26 in clock/counter 7. Upon there being a match between the Real Time count and the pretime, there is an output from comparator 14 to flip-flop 66 in logic circuit 16 placing the flip-flop in its reset state. Flip-flop 66 had been placed in its one state priorly, as described further on, and its one output was high. This one output is connected to the preset to zero inputs PS of counter 34, pulse counter 38, timer 39 and also applied to gain control 76 to enable it to function. The PS inputs of circuits 34, 38 and 39 being high, not only preset them to zero but disabled them from operating. With comparator 14 now placing flip-flop 66 in its reset or zero state, circuits 34, 38, 39 and 76 are enabled to operate.

Counter 34 starts counting up to 9999, which is a one millisecond total, and various stages of this counter are connected to other circuits. The full or one millisecond count occurs for each pulse of the master station pulse train being received and is input to ulse count circuit 38 which is thereby incremented one count as each pulse is received, up to a maximum of nine pulses. Circuit 38 thus keeps track of which pulse is being received and applies this information via multiplexer 8 to microprocessor 9 which then knows when to clear various circuits and prepare them for the next received master station pulse train. Upon circuit 38 achieving a full nine count, it applies a signal to the set input 5 of flip-flop 66 to place it in its one state and preset circuits 34, 38 and 39 and disable circuits 34, 38, 39 and 76.

Counter 34 applies outputs to OR gates 88 and 89 in cycle detector 82 to identify two search windows used in locating the third cycle positive zero crossing of each pulse. There are three other outputs from counter 34 which are applied to the clocking input CK of flip-flops 42, 43 and 44. These flip-flops are used to take samples 65.0 microseconds, 58.8 microseconds and 52.5 microseconds before the third cycle positive zero crossing of each pulse to determine if there is another signal occurring in time before the signal whose arrival is calculated by microprocessor 9. This is done because the receiver may have locked onto a sky wave and the desired ground wave will be detected ahead of the calculated signal. Three samples are taken in case one sample occurs at a zero crossing or in case the sky wave and ground wave interfere producing a null at one sample point. If microprocesor 9 determines from these samples prior in time to the calculated signal that there is an earlier signal having the same GRI, the microprocessor subtracts 40 microseconds from the calculated time and the procedures are repeated. This continues until no signal having the same GRI is detected prior to the calculated time arrival, thereby indicating that the receiver has located and is locked onto the ground wave.

Once the ground wave is locked onto the third cycle positive zero crossing ?? must be located for each pulse of the master station pulse trains. This is primarily the function of cycle detector 82 and zero crossing detector 6.

In cycle detector 82 each received signal in its RF state from inverter 81 is applied undemodulated to 5 microsecond delay line 83 and to variable resistor 84 of cycle detector 82. The output of delay circuit 83 and resistor 84 are input to summing circuit 85 which sums the two RF signals being input thereto on a point-by-point, cycle-by-cycle basis to produce an RF output signal having a different waveform but of the same frequency as the input signals. The signals input to summing circuit 85 are shown in FIG. 9D, while the signal output from summing circuit 85 is shown in FIG. 9E. In FIG. 9D, the sinusoidal signal designated by waveform envelope 98 has the same envelope shape and same RF phase as the received RF LORAN-C signal. Variable resistor 84 attenuates the received and undemodulated signal to produce the signal represented by waveform 100. Five microsecond delay circuit 83 delays the whole received signal by 5 microseconds while introducing little or no loss and the signal output from the circuit is represented by the sinusoidal signal having the waveform 100. Summing circuit 85 processes or algebraically combines the two RF signals 98 and 100 input thereto on a point-by-point, cycle-by-cycle basis in a subtractive manner due to these two signals being 180° out of phase with each other to produce an output signal having the waveform 101 shown in FIG. 9E. It may be seen that the instantaneous carrier frequency of the output signal 101 is the same as the frequency of the two signals input to summing circuit 85. However, up to time $T_x$, the output signal 101 is in phase with signal 98, but thereafter undergoes a 180° phase shift and signal 101 is then in phase with signal 100. The phase is determined by which of the two signal inputs to summing circuit 85 has the greater amplitude and the phase change point is therefore adjustable by the setting of variable resistor 84. Variable resistor 84 is adjusted so that the amplitudes of signals 98 and 100 cross each other at point 99 which need only be within the negative portion of the third carrier cycle of undelayed signal 98. Prior in time to point 99, which corresponds to time $T_x$, the amplitude of each cycle of signal 98 is greater than the amplitude of each cycle of signal 100, and this causes output signal 101 from summing circuit 85 to be in phase with signal 98. After time $T_x$, however, the amplitude of each cycle of signal 100 is greater than the amplitude of each cycle of signal 98 and output signal 101 is in phase with signal 100 as shown. Variable resistor 84 is adjusted to cause the phase reversal to take place during the 5 microsecond duration of the negative half of the third received LORAN-C cycle and, more particularly, to point 99 as shown in FIG. 9D in this embodiment of the invention.

Figure 9:
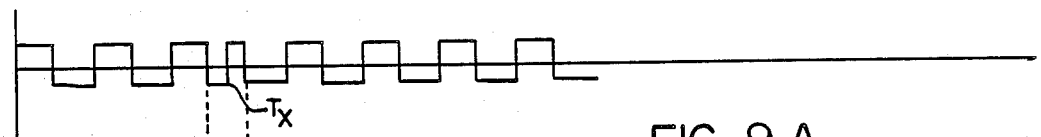
FIGS. 9A–9E show some waveforms useful in understanding the operation of cycle detector 82 in FIG. 5.
Figure 9:
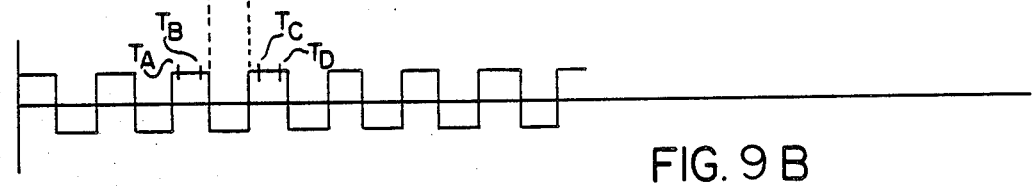
Figure 9:
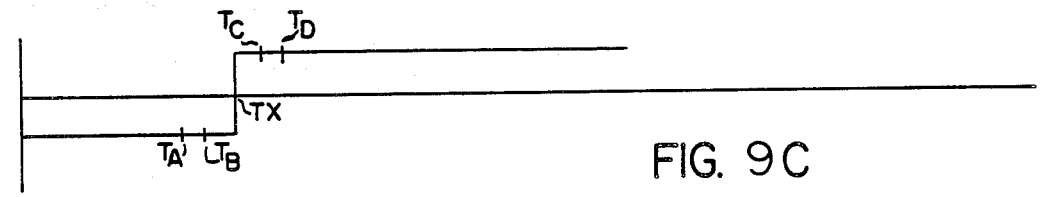
Figure 9D:
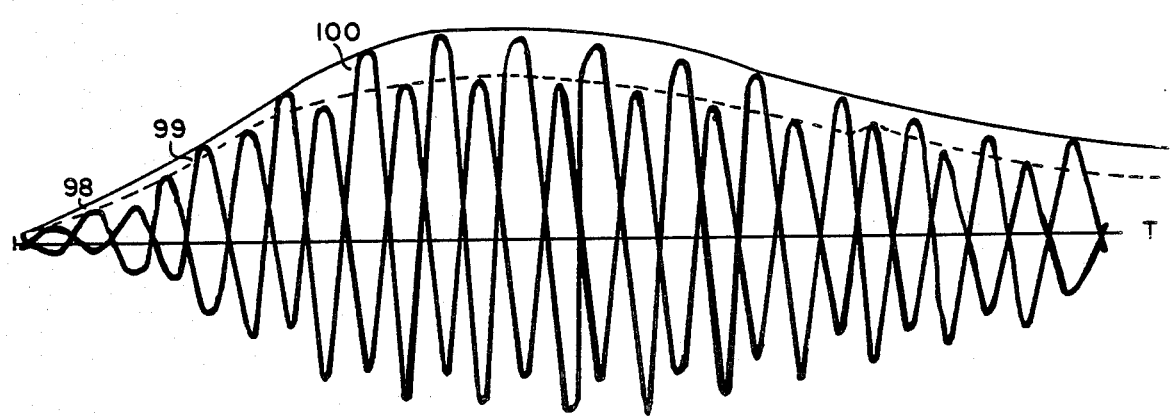
Figure 9E:
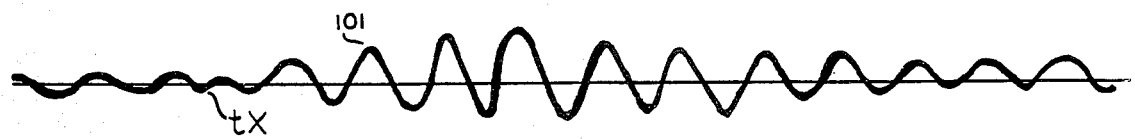

Signal 101 in FIG. 9E is output from summing circuit 85 and applied to limiter 86 which converts the radio frequency signal to a square wave by clipping the signal amplitude in a well-known manner to produce the binary waveform shown in FIG. 9A. The phase reversal which occurs at time $T_x$ is also shown in this figure.

The binary signal output from limiter 86 is input to exclusive OR gate 87. There is a second input to exclusive OR gate 87 from logic circuit 16. The waveform of this clock signal is shown in FIG. 9B. This clock signal is 100 KHz and includes phase code reversals (not shown) so that phase code phase shifts are removed and do not affect the operation of other circuitry in cycle detector 82. When the signals input to gate 87 as shown in FIG. 9A and FIG. 9B are in phase with each other, there is no output from gate 87. However, after time $T_x$ due to the phase reversal created by the action of summing circuit 85, it may be seen in FIGS. 9A and 9B that the signals input to gate 87 are no longer in phase with each other. As a result, starting at time $T_x$, the output of exclusive OR gate 87 goes as high as shown in FIG. 9C. The high output from gate 87 is applied to counter enable input CE of counter 90 to enable this counter to operate in response to start and stop signals which will be described hereinafter.

As mentioned briefly heretofore, the LORAN-C receiver equipment including microprocessor 9, locates the transmissions from the master and each of the secondary stations from a selected LORAN-C transmitter chain. After locating the signals transmitted by the master and secondary stations of the selected LORAN-C chain at the GRI rate, microprocessor 9 calculates the expected time of arrival of subsequent received signals from these stations. At the expected start time of the first pulse of the pulse train from a master or secondary station, counter 90 is energized via logic circuit 16 and OR gate 88 to start counting the 10 MHz clock input thereto.

Figure 5:
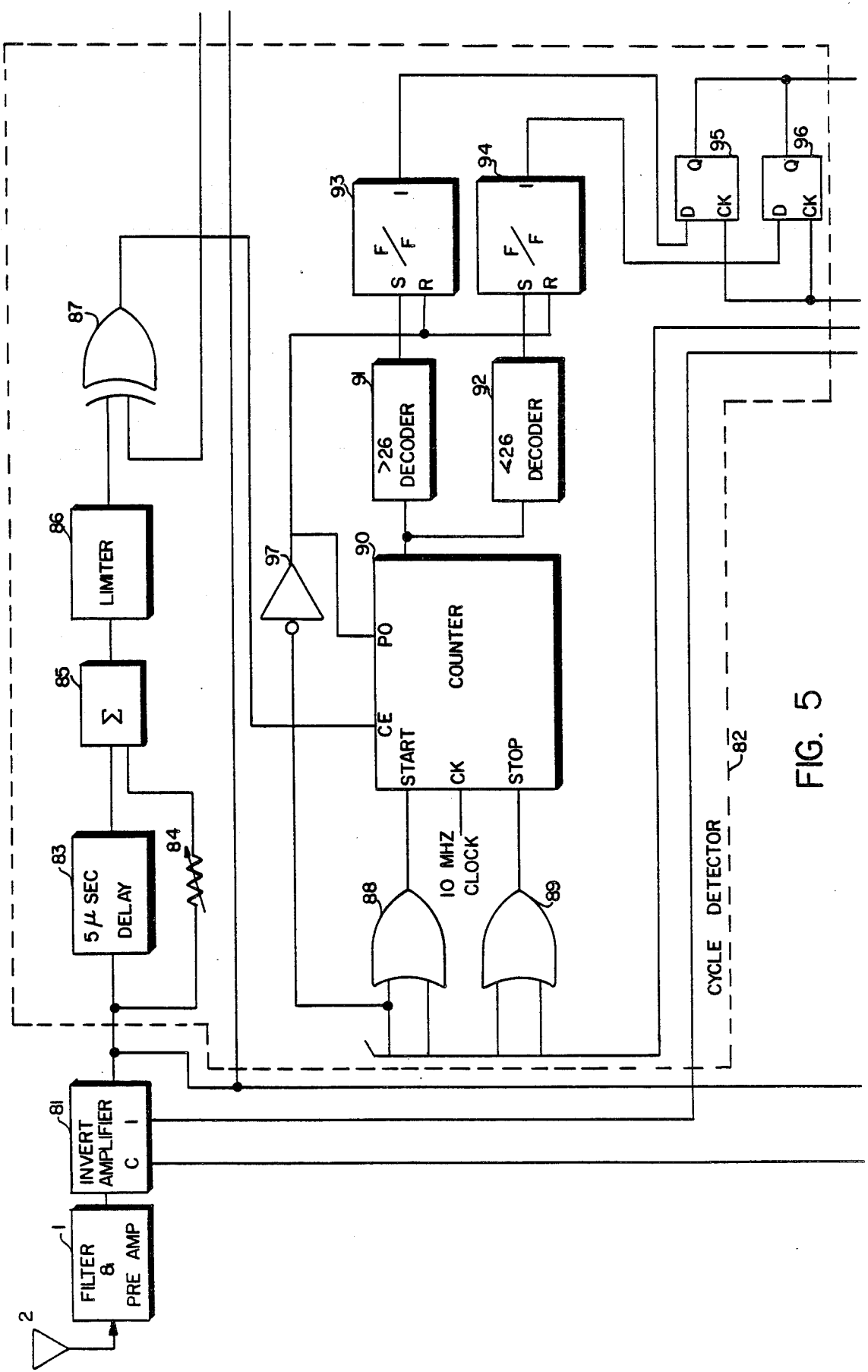

As may be seen in FIG. 5, there are four inputs to OR gates 88 and 89 and these sequentially go high once for each pulse of the pulse trains from both the master and secondary stations under the control of counter 34 in logic circuit 16. That is, each of these four inputs momentarily goes high once every 1000 microseconds. These times are represented by $T_a$, $T_b$, $T_c$ and $T_d$ in FIG. 9B. The two inputs to OR gate 88 are represented by times $T_a$ and $T_c$. The two inputs to OR gate 89 are represented by times $T_b$ and $T_d$. The output of OR gate 88 is connected to the start input of counter 90 while the output of OR gate 89 is connected to the STOP input thereof. When counter 90 is enabled to count, it counts pulses from a 10 MHz clock applied to its clocking input CK. Thus, as generally represented in FIGS. 9B and 9C, counter 90 is enabled to count, it counts pulses from a 10 MHz clock applied to its clocking input CK. Thus, as generally represented in FIGS. 9B and 9C, counter 90 is enabled to count at time $T_a$ and is then disabled from counting at time $T_b$. Directly thereafter, counter 90 is again enabled to count at time $T_c$ and is then disabled from counting at time $T_d$. These start and stop times open and close two 2.5 microsecond search windows set 12.5 microseconds apart to be placed by microprocessor 9 calculating pretime on either side of time $T_x$ for each pulse as shown in both FIGS. 9B and 9C. In each of these search windows, the signal output from exclusive OR gate 87 as shown in FIG. 9C is sampled a maximum of twenty-five times at 0.1 microsecond spacing. The results of this sampling are stored in counter 90 because the clock pulses are counted while input CE is jointly high and the count is decoded and checked by decoders 91 and 92. If the count in counter 90 is less than twenty-six, there is an output from decoder 92 and if the count is greater than twenty-six, there is an output from decoder 91. The results of the decoding by decoders 91 and 92 will be an output of 00, 01, 10 or 11 for each pulse and the results are temporarily stored in flip-flops 93 and 94. The results are then transferred to flip-flops 95 and 96 upon being clocked therein under the control of an output of counter 34 in logic circuit 16.

In the ideal case, with no received noise or spurious signals, and detector 82 is in phase with the received signal pulse, the zero-to-one transition of the signal output from exclusive OR gate 87 as shown in FIG. 9C is stable at time $T_x$. However, in actual operation, noise and spurious signals cause this transition to fluctuate in time, that is, not to occur at precise time intervals. In addition, spurious momentary spike-like transitions occurring prior to or after time $T_x$ can also be mistakenly identified as the desired transition at time $T_x$ and degrade reliable LORAN-C receiver operation. Further, non-phase coherence between the received signal and the clock driving gates 88 and 89 will cause the zero-to-one transition output from gate 87 to occur earlier or later than $T_x$. All of these affect the count in counter 90 for each pulse.

To minimize the effect of the above problems, the search windows between times $T_a$ and $T_b$ and times $T_c$ and $T_d$ are utilized. More particularly, twenty-six samples are taken within each search window and an analysis is initially made by decoders 91 and 92 for each pulse. Flip-flops 95 and 96 forward the signal outputs of decoders 91 and 92 for every pulse via multiplexer 8 to microprocessor 9 which develops a histogram for a large number of pulses. The histogram is analyzed to decide if the microprocessor calculated time of arrival should be revised.

In the ideal signal case with no transients or fluctuations as shown in FIG. 9C, at any time prior to time $T_x$ the output of exclusive OR gate 87 in FIG. 8 is low and does not enable counter 90. At time $T_a$, which is 941.3 microseconds after the start of pretime upon which counter 34 is enabled, OR gate 88 enables the start input of counter 90 as mentioned previously, but cycles of the 10 MHz clock input to counter 90 cannot be counted as counter enable input CE is not energized by gate 87. Thereafter, OR gate 89 provides a stop signal to counter 90 at time $T_b$ which is 2.5 microseconds later than start signal $T_a$. In this case, counter 90 has a zero count therein immediately following the search window between $T_a$ and $T_b$. The zero count is detected by decoder 92 which provides an output to set flip-flop 94 to its one state whenever there is a count less than thirteen in counter 90. Also, decoder 91 will maintain a zero output which will be applied via flip-flops 93 and 95 and multiplexer 8 to microprocessor 9. Thus, microprocessor 9 receives an 01 signal indicating correct location of the point immediately preceding the third cycle positive zero crossing. The next output from zero crossing detector 6 is then the desired zero crossing.

In the event transients occur within the search window between times $T_a$ and $T_b$, the transients each cause counter enable input CE of counter 90 to go high. For the extremely brief period of time defined by the transients within the search window, a cycle of the 10 MHz clock applied to clocking input CK is counted by counter 90. If more than one transient appears within this first search window, multiple counts will appear in counter 90. Statistically, the number of counts in counter 90 will be less than thirteen for the search window defined by $T_a$ to $T_b$ when the sample point is prior to time $T_x$ in FIG. 9C.

For a perfect received signal with no noise or spurious signals, the output from exclusive OR gate 87 will always be high during the search window between times $T_c$ and $T_d$ which starts 12.5 microseconds after $T_b$ and which must be adjusted by calculation of pretime to occur after time $T_x$. During this latter search window which is also of 2.5 microseconds duration in this embodiment of my invention, there will also occur twenty-five pulses from the 10 MHz clock applied to clocking input CK of counter 90 resulting in a count of twenty-five being stored in counter 90. This count of twenty-five is detected by decoder 91 as being a count greater than thirteen which places flip-flop 93 in its set state. Flip-flop 93 being in its set state provides an indication to microprocessor 9 that the signal level occurring within the $T_c$–$T_d$ search window is at one level.

Noise transients occurring within the search window between $T_c$ and $T_d$ will cause the one level to go to a zero level. This means that the output of exclusive OR gate 87 goes to zero during this latter search window for each transient, which in turn disables counter 90 from counting a cycle of the 10 MHz clock. Statistically, transients will not cause a count of less than thirteen in counter 90 between times $T_c$ and $T_d$ if counter 90 is started at the proper time by outputs of OR gate 88 ultimately under the control of microprocessor 9. The equal to or greater than thirteen count in counter 90 is detected by decoder 91 which places flip-flop 93 in its one state. Microprocessor 9 takes the one output of flip-flop 93 via flip-flop 95 and multiplexer 8 to indicate that the signal level within the search window between $T_c$ and $T_d$ is at a one level.

With the operation of the circuitry in FIG. 5 just described, it can be seen that the circuitry develops and analyzes samples within each of the two search windows that are adjusted to be on either side of the transition occurring at time $T_x$ which points to the desired cycle of the carrier frequency which occurs immediately thereafter. The effect of the histograms developed by microprocessor 9 from the outputs from cycle detector 82 is to statistically eliminate the effect of noise transients and spurious signals that occur within the 2.5 microsecond search windows that microprocessor 9 jointly shifts to be placed on either side of the transition at time $T_x$. In addition, phase incoherence between the received signal and signal outputs from counter 34 controlling the sample windows will not affect cycle detector 82 in conjunction with revised pretime calculations by microprocessor 9 from accurately indicating that the next positive zero crossing indication by detector 6 is for the desired third cycle. Thus, the desired zero crossing of each LORAN-C pulse occurring immediately after the transition at time $T_x$ is easier to locate and time difference of LORAN-C signal arrival measurements are made more accurately, even in noisy signal environments wherein the signal-to-noise ratio of the received signal is low.

The circuit operation just described wherein the two search windows straddle the transition at $T_x$ is premised on the assumption that microprocessor 9 functioning with the other receiver circuitry has started counter 34 in logic circuit 16 at the proper time. In reality this does not occur because in the rough search mode the tracking point of each pulse is not determined within a few microseconds. Thus, the two search windows may not initially be one on either side of the transition occurring at time $T_x$ for each pulse. If both search windows initially occur prior to the transition at time $T_x$, the histogram assembled by microprocessor 9 from cycle detector 82 outputs will have a zero count for both search windows. Microprocessor 9 responds to this zero-zero histogram indication that it develops over many pulses to increment the calculated time of arrival of the pulse trains form the master and secondary stations by increments of 10 microseconds, which are multiples of one carrier cycle, and thereby ultimately enables counter 90 to start counting at a later time equal to the increment. The process described for cycle detector 82 is then repeated and microprocessor 9 again analyzes the results. If the result is again a zero-zero count for both search windows, microprocessor 9 again increments the calculated time of arrival until the desired zero-one histogram count occurs indicating that the transition at time $T_x$ has been located.

In a similar manner, if microprocessor 9 receives an indication of a one count within both search windows, the calculated time of arrival of the LORAN-C signals is decremented and the procedure is repeated. This decrementing or incrementing process is continued until microprocessor 9 receives a zero count for the search window occurring between times $T_a$ and $T_b$ and a one count for the search window occurring between times $T_c$ and $T_d$. In this manner, circuitry of FIG. 5 functioning in conjunction with microprocessor 9 accurately locates the transition at time $T_x$ and thereby knows that the next positive zero crossing of the carrier is the desired third cycle positive zero crossing of the received pulse signal used to make the time difference of signal arrival measurements.

Thus, microprocessor 9 functioning with the other receiver circuitry operates as a phase-locked-loop servo with cycle detector 82 and zero crossing detector 6 more particularly closing the loop to allow the receiver to accurately locate the third cycle positive zero crossing of each pulse. This operation occurs in the fine search mode for the master and all secondary stations.

In the prior art LORAN-C receiver circuitry sampled and analyzed received signals to first identify master and secondary station signals and then to locate the third cycle positive zero crossing tracking point. This process was designed to take at least several minutes to assure that the tracking point was accurately located or acquired as the signal-to-noise ratio could be very low. However, this long acquisition time was still used even when strong signals were received resulting in a high signal-to-noise ratio. Unlike the prior art, my novel receiver provides adaptive bandwidth for the tracking servo wherein in a strong signal environment with a high signal-to-noise ratio the high signal-to-noise ratio is determined and time difference of signal arrival measurements are output to the operator in a matter of seconds. In a weak signal environment, however, a signal-to-noise ratio is determined and a longer time is required to provide the output to the operator.

To accomplish this, cycle detector 82 is utilized in conjunction with microprocessor 9. As previously described, microprocessor 9 and the other receiver circuitry cooperate in a phase-locked-loop second order tracking servo mode to locate a specific point at time $T_x$ a few microseconds before the tracking point. Upon accurately locating the specific point, the output from detector 82 to microprocessor 9 is a zero-one indication as previously described. A zero-one indication will be given to microprocessor 9 for every pulse in a perfect signal environment. However, as the signal-to-noise ratio decreases, the zero-one histogram developed by microprocessor 9 will show fewer and fewer zero-one counts for a given number of samples. In addition, increased noise will cause an increase in the one-zero output from cycle detector 82 to microprocessor 9. The one-zero output is caused strictly by noise. Microprocessor 9 is programmed to compare the result of the zero-one histogram with the one-zero histogram, both of which it develops, to derive a signal-to-noise ratio. This ratio provides an indication to microprocessor 9 how to adjust the adaptive bandwidth for the tracking servo. In addition, the LORAN-C receiver operator may operate a front panel control to get a readout on display 51 and 52 of the signal-to-noise ratio for each of the master and secondary stations of the selected LORAN-C transmitter chains. It would be obvious to one skilled in the art that signal-to-noise ratio may be derived in a number of different ways that may all be used in the implementing of the present invention.

The signal-to-noise ratio determined by the receiver just described is utilized in accordance with the teaching of my invention to do two things. First, the time constant of the tracking servo implemented by the receiver circuitry previously described is not fixed as in the prior art, but is variable. In the present embodiment this time constant, which sets how long a period received data is averaged over, is varied between five seconds and twenty seconds depending on the signal-to-noise ratio. As the noise increases the servo time constant, that is, the time period over which microprocessor 9 averages time interval data, is increased and vice versa. This allows the receiver to quickly provide position information and also allows the receiver to be used on craft that have a higher velocity than or undergoes more rapid acceleration than relatively slow speed craft such as boats.

Second, the receiver modifies measured time of receipt data depending on the signal-to-noise ratio. From past history of time of receipt of signals the receiver calculates the time of arrival of subsequent signals received from each of the master and associated secondary LORAN-C stations. As previously described, the receiver looks for the third cycle positive zero crossing of each of the master and secondary station signals within ten microsecond wide windows of time centered on the calculated time of receipt for the zero crossing of each signal. Motion of the craft on which the receiver is located introduces only a very small error between the calculated time of the zero crossing and the actual time thereof. All other deviations between each calculated zero crossing time and the time of detecting same are caused by noise. These deviations occur within plus or minus five microseconds of the calculated time of arrival. Despite the noise, it is known that deviations of say plus or minus three or four microseconds just aren't valid because the craft can't move far enough since the last reading to cause such deviations. With this foreknowledge that measured values are close to the calculated values, each measured time of receipt is modified by microprocessor 9 to be a more realistic value. For each measured time of receipt occurring before the calculated value an increment of time is algebraically added to the measured value to move it closer to the calculated time. This increment of time is constant for a particular signal-to-noise ratio of the received signal. Similarly, for each measured time interval occurring after the calculated value, increments of time are subtracted from the measured values to move them closer to the calculated time. The result is to change the statistical distribution of measured values caused by noise from a bell-shaped curve such as curve A in FIG. 10 to curve B or C. It is this modified data that is actually used by the receiver circuitry to provide position information and to revise the calculations of the time of arrival of subsequent signals received from the master and secondary stations.

In an alternative embodiment, one skilled in the art may vary the increment of time depending on the deviation such that the greater the deviation between the measured value and the calculated value of signal receipt, the greater is the time increment added to the measured value.

In operation the signal-to-noise ratio is derived as previously described in this specification. In the preferred embodiment of the invention the signal-to-noise ratio figure for each of the master and secondary stations is independently determined and each figure is used in modifying the measured time of receipt data for the corresponding station. However, one skilled in the art may use the signal-to-noise ratio of a single station, say the master station, to modify the time of receipt of signals from all stations in an alternate embodiment of the invention.

Samples of the modification done to measured values of time of receipt of master or secondary station signals relative to the calculated time of receipt are as follows with reference to Tables A and B.

TABLE A

| S/N | Measured Deviation | Modifier | Correction Added To Measured Value |
|---|---|---|---|
| 80 | +1 sec | 0.8 | −0.8 sec |
| 80 | +3 | 0.8 | −2.4 |
| 80 | +5 | 0.8 | −4.0 |

TABLE A-continued

| S/N | Measured Deviation | Modifier | Correction Added To Measured Value |
|---|---|---|---|
| 80 | −2 | 0.8 | +1.6 |
| 80 | −3 | 0.8 | +2.4 |
| 80 | −4 | 0.8 | +3.2 |

TABLE B

| S/N | Measured Deviation | Modifier | Correction Added To Measured Value |
|---|---|---|---|
| 30 | +1 sec | 0.3 | −0.3 sec |
| 30 | +3 | 0.3 | −0.9 |
| 30 | +5 | 0.3 | −1.5 |
| 30 | −2 | 0.3 | +0.6 |
| 30 | −3 | 0.3 | +0.9 |
| 30 | −4 | 0.3 | +1.2 |

In Tables A and B the first column is a figure (based on the range 0–100) representing signal-to-noise ratio (S/N) with zero being the lowest and one hundred being the highest. In the third column is the signal-to-noise ratio (S/N) modifier which is a positive number less than one and greater than zero. The smaller the signal-to-noise ratio the smaller is the modifier and vice versa. The second column in Tables A and B is the deviation in microseconds between the calculated time of signal arrival and the measured time of signal arrival. As measured values are detected within a ten microsecond wide window centered on the calculated value, all values of measured deviation must be within plus or minus five microseconds of the calculated value. The correction value in the fourth column in each of the tables represents the value obtained when multiplying the measured deviation in column 2 by the modifier in column 3. The sign placed before the correction value is opposite that of the measured deviation so when it is algebraically added to the actual measured value of time of signal receipt a new value is obtained which is closer in time to the calculated value. This modifies the measured times of receipt represented by statistical distribution curve A in FIG. 10 to create another statistical distribution curve represented by either curves B or C in FIG. 10 depending on signal-to-noise ratio. Starting with a given set of time of signal receipt data, curve B in FIG. 10 is obtained on modifying the data in one signal-to-noise ratio environment and curve C is obtained in a higher signal-to-noise ratio environment. For example, assume that a completely arbitrary receiver internal clock reading of 123,456.0 microseconds is the calculated center of the time window in which certain signals are received and, also arbitrary, that the same reading will be for each receipt of the signals. With reference to the first line of Table A, the measured time of receipt would be one microsecond more than the calculated time yielding a reading of 123,457.0 microseconds which, after correction yields 123,456.2 microseconds. The latter corrected figure is closer to the calculated figure which in reality is equal to or very close to the actual time of signal arrival.

On the front panel of the LORAN-C receiver are lamps 70 through 75 respectively entitled M, S1, S2, S3, S4 and S5 and associated with master and secondary stations of the selected LORAN-C chain. While particular ones of these stations are being acquired, the associated one of the lamps is flashed by microprocessor 9. After the signal has been acquired for any particular station and time difference of signal arrival measurements can reliably be made utilizing that particular station, the associated one of lamps 70 through 75 is lit steadily. In this manner, the receiver operator knows which secondary stations can be relied on when identifying stations with thumbwheel switches 61 and 62 to be used to make time difference of signal arrival measurements.

Once master station signals of the selected LORAN-C chain have accurately been acquired using the coarse and fine search modes previously described, the receiver circuitry then goes into the secondary station coarse search mode. In this mode, microprocessor 9 divides the time interval between receipt of any two master station signals up into a number of time slot bins. As indications are received from smart shift register 3 and logic circuit 4 of received secondary station signals, as well as indication of the time received from clock-/counter 7 via latch 5, a count is placed in an appropriate computer program created time slot bin. The contents of the bin are analyzed by microprocessor 9 to locate the secondary station signals for the selected LORAN-C chain. Once located, for each secondary station the particular time slot bin for a secondary station as well as the slot on either side thereof are broken down into a large number of time slot bins each of shorter time duration. Again the above process is repeated to more closely identify the time of arrival of the desired secondary station signals. Then microprocessor 9 can begin to calculate the approximate time of arrival of the secondary station signals. At this time microprocessor 9 causes the other circuitry to change to fine search mode which is the same for the secondary stations as it was for the master station which fine search mode was previously described in detail. Again, when a zero-one histogram is developed by microprocessor 9 for each secondary station, the microprocessor knows that the next positive zero crossing detected by zero crossing detector 6 is the desired third cycle positive zero crossing.

In the fine search mode for master and secondary stations, microprocessor 9 stores and analyzes by integration the latch 5 indicated times of receipt for the third cycle positive zero crossing for all master and secondary station pulses to make sure they are accurately located and then the time difference of signal arrival measurements are made and displayed for the secondary stations identified by the receiver operator using thumbwheel switches 61 and 62.

Figure 2:
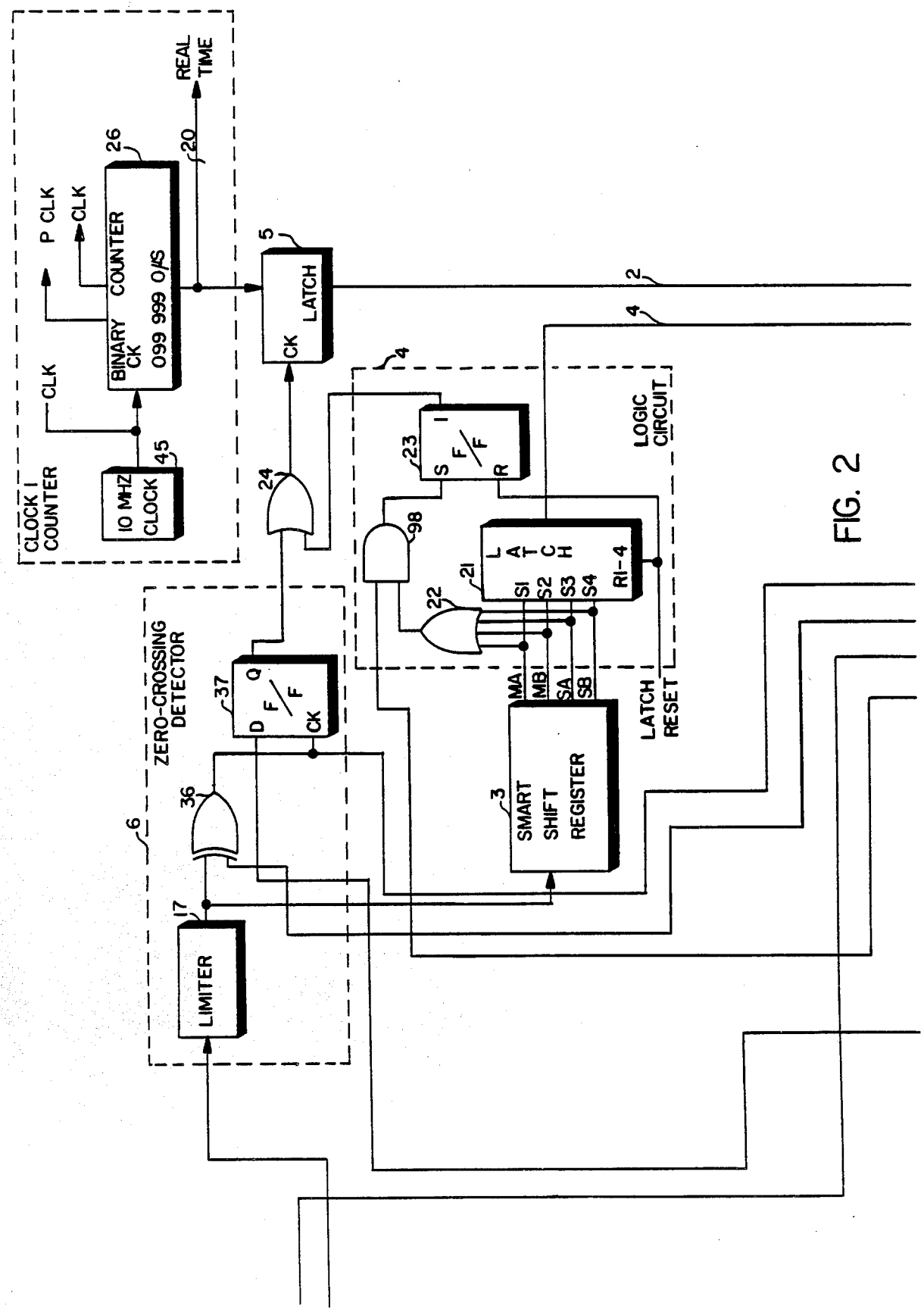

The operation of zero crossing detector 6 in FIG. 2 is now described. It can be seen that the input to detector 6 is from inverting amplifier 81 in FIG. 5. The input is still the 100 KHz radio frequency signal which is hard limited by limiter 17 to produce a binary signal at the 100 KHz frequency. This signal passes through exclusive OR gate 36 and is applied to the clocking input CK of flip-flop 37. The D input of flip-flop 37 is controlled by counter 34 in logic circuit 16 and goes high at the beginning of each received pulse.

Flip-flop 37 in detector 6 being placed in its set state with its one output high upon both its inputs being high, causes latch 5 to store the contents of counter 26 at that particular moment in time. Microprocessor 9 thereby receives a time indication of the beginning of each radio frequency cycle of each of the pulses and this information is used to make the required time difference of arrival measurements which are the basis of the LORAN-C system. Flip-flop 37 is returned to its reset state before the beginning of the first cycle of a subsequent pulse received from a master or secondary station by the LATCH RESET signal as described heretofore.

Microprocessor 9 thereby has a multiplicity of clock times, one for each positive zero crossing, being entered into latch 5. They are all ignored, however, except for the desired third cycle positive zero crossing. As previously described, microprocessor 9 functions with other circuitry including particularly cycle detector 82 to adjust the calculated time of arrival and receive an indication at time $T_x$ as previously described for detector 82 which will occur a few microseconds before the third cycle positive zero crossing for each pulse. Thus, in response to the time $T_x$ determination by microprocessor 9, only the clock time for the third cycle positive zero crossing for each pulse is actually taken by microprocessor 9 in the fine search mode for both master and secondary stations for the time diffference of signal arrival measurements.

As is well known in the art, each of the pulses of the pulse trains received from master and secondary LORAN-C stations is phase coded. This phase coding must be removed within my LORAN-C receiver or 5 microsecond time measurement errors can occur. To accomplish this, when microprocessor 9 changes the receiver over to the fine search mode for either master or secondary station signal acquisition, the microprocessor parallel loads the phase coding for the first eight pulses of the next to be received master or secondary station pulse train of the selected LORAN-C chain into parallel/serial converter 35 of logic circuit 16 via its $\emptyset$ code load output. Converter 35 is a conventional shift register well-known in the art which may be loaded in parallel and then shifted out in serial to perform parallel to serial conversion. This phase coding is stored in microprocessor 9 and is selected by information input to the equipment by the operator using thumbwheel switches 11. The clocking input CL to converter 35 is 100 KHz and the phase code contents of converter 35 are serially shifted out at a 100 KHz rate. The output Q of converter 35 is connected via exclusive OR gate 33 to one of the two inputs of exclusive OR gate 36 in zero crossing detector 6. Exclusive OR gate 36 functions as an inverter in this case in a manner well-known to circuit designers. When a particular one of the pulses of the pulse trains received from a master or secondary station is of a positive phase, there is no signal or a zero on output Q from converter 35. The result is that each radio frequency cycle of a pulse is hard limited by limiter 17 and will pass directly through exclusive OR gate 36 to flip-flop 37 phase unchanged. Upon the expected receipt of a pulse which is to be of a negative phase, converter 35 will have a one at its output which causes gate 36 to invert the phase of the pulse output from limiter 17. That is, the signal being input to detector 6 is effectively shifted 180° thereby eliminating the negative phase coding applied to the particular pulse. This is done in order that there will be an output from exclusive OR gate 36 to place flip-flop 37 in its set state at exactly the beginning of each pulse of the pulse trains from the master and secondary stations irregardless of phase shift.

A gain control circuit 76 in FIG. 6 is also provided to automatically adjust the gain level of amplifier 81 in FIG. 5 to thereby assure that the signal level to other circuitry in the receiver is sufficient for proper operation of the circuitry. Potentiometer 77 is connected as a voltage divider and is adjusted to apply a predetermined voltage to one of the two inputs of comparator 78. The other input to comparator 78 is connected to the output of amplifier 81 to monitor the signal level. When the signal level output from amplifier 81 becomes too low, there is a high output from comparator 78 which is connected to one of the two inputs of AND gate 79. The other input of gate 79 goes high when flip-flop 66 in logic circuit 16 is placed in its reset state at the beginning of the calculated pretime. Thus, there is an output from gate 79 to place flip-flop 80 in its set or one state when the signal output from amplifier 81 is too low and at the beginning of pretime. Flip-flop being in its set state applies a signal to the control input C of amplifier 81 causing it to change to a higher gain level. The reset input of flip-flop 80 goes high returning it to its zero or reset state under control of the same signal that causes the calculated preset time to be loaded into latch 15 in FIG. 4. Thus, the gain of amplifier 81 is returned to its normal lower level prior to receiving each pulse train from a master or secondary station.

The signals output from microprocessor 9 to display 12 are applied to the appropriate digital display units therein. Digital display unit 51 is used to visually display the time difference of arrival information for one selected secondary station, and digital display 52 is used to visually display the time difference of arrival information for a second selected secondary station. The inputs to these digital displays is encoded and is appropriately decoded by anode drivers 46 and 47, anode decoder 48 and decoder/drivers 50 and 68 to drive digital displays 52 and 51 respectively. These displays along with their associated decoding and driving circuitry are well-known in the art and are commercially available.

To select the secondary stations, the time difference of arrival measurements for which are to be displayed on displays 51 and 52, thumbwheel switches 61 and 62 are provided. Switch 61 is physically adjacent to display 51 and one of the numbers "1" to "5" is selected with this switch to indicate to processor 9 the information to be displayed. Similarly, thumbwheel switch 62 is associated with display 52 and is used by the equipment operator to indicate the particular secondary station arrival measurement to be displayed on display 52.

Although preferred embodiments of the invention have been described in considerable detail for illustrative purposes, many modifications will occur to those skilled in the art. It is therefore desired that the protection afforded by Letters Patent be limited only by the true scope of the appended claims.

I claim:

1. A method for processing signals periodically received and tracked by a receiver which predetermines the time when each subsequent signal is to be received to aid in the detection and tracking of the received signals, comprising the steps of:
   measuring the ratio of signal-to-noise of said received periodic signals, and
   modifying the actual time of signal reception at said receiver of each periodic signal to get a modified time of signal reception that is closer in time to the corresponding predetermined time of signal reception thereby decreasing the time deviation caused by noise that is actually erroneous, the degree of time modification being dependent upon said signal-to-noise ratio, said modified times of signal reception being used by said receiver to provide more accurate signal tracking.

2. The method in accordance with claim 1 wherein the step of modifying the actual time of signal reception comprises the steps of:
   measuring the time deviation between the predetermined time of signal reception of each of said periodically received signals and the actual time of signal reception thereof at said receiver,
   modifying said measured time deviations to get modified time deviations, the magnitude of the modified time deviations normally being smaller than the magnitude of the measured time deviations to decrease erroneous time deviation magnitudes caused by noise, and
   correcting the actual time of signal reception with said modified time deviations to derive modified times of signal reception which are used by said receiver to track said periodically received signals more accurately than when using said actual times of signal reception.

3. The method in accordance with claim 2 wherein the step of modifying the measured time deviations comprises the steps of:
   selecting a multiplier greater than zero and less than one depending on the value of said signal-to-noise ratio, and
   multiplying said measured time deviation for each of said periodic signals by said multiplier to derive modified time deviations that are less than the measured time deviations.

4. A method for processing signals received periodically in and used by a navigation receiver to improve the accuracy of position information provided by the receiver, the receiver predetermining the times when each subsequent signal is to be received and then measuring the actual time of signal reception of same to aid in the detection and tracking of the received signals and comprising the steps of:
   measuring the ratio of signal-to-noise of said received periodic signals to said noise, and
   modifying the actual time of signal reception at said receiver of each periodic signal by an amount in relationship to said ratio to get modified times of signal reception that are closer in time to the corresponding predetermined times of signal reception thereby decreasing time deviations caused by noise that are erroneous, said modified times of signal reception being used by said receiver to provide more accurate position information.

5. A method for processing LORAN-C signals periodically received by a LORAN-C navigation receiver to improve the accuracy of navigation position information provided by the receiver, the receiver first receiving and averaging information regarding time of receipt of said signals, second predetermining the times when each subsequent signal is to be received and looking for each said subsequent received signal only within a small period of time centered on the predetermined time of receiving same to track said LORAN-C signals and provide position information for navigation purposes to the operator of the receiver comprising the steps of:
   measuring the ratio of signal-to-noise to noise of said received periodic signals, and
   modifying the actual time of signal reception by an amount in relationship to said ratio to get modified times of signal reception that are closer in time to the corresponding predetermined times of signal reception thereby decreasing time deviations caused by noise that are erroneous, said modified times of signal reception being used by said receiver to provide more accurate position information.

6. The method in accordance with claims 4 or 5 wherein the step of modifying the actual time of signal reception comprises the steps of:

measuring the time deviation between the predetermined time of signal reception of each of said periodically received signals and the actual time of signal reception thereof at said receiver, modifying said measured time deviations to get modified time deviations, the magnitude of the modified time deviations being smaller than the magnitude of the measured time deviations to decrease time deviation magnitudes that are erroneous, and algebraically adding each of said modified time deviations to the corresponding predetermined time of signal receipt to derive modified times of signal reception which are used by said receiver to provide more accurate position information than when using actual times of signal reception.

7. The method in accordance with claim 6 wherein the step of modifying the measured time deviations comprises the steps of:

selecting a multiplier greater than zero and less than or equal to one depending on the value of the received signal-to-noise to noise ratio, and multiplying said measured time deviation for each of said periodic signals by said multiplier to derive modified time deviations that are less than said measured time deviations.

\* \* \* \* \*

UNITED STATES PATENT OFFICE
CERTIFICATE OF CORRECTION

PATENT NO. : 4,468,668  
DATED : August 28, 1984  
INVENTOR(S) : Lester R. Brodeur Page 1 of 2

It is certified that error appears in the above-identified patent and that said Letters Patent are hereby corrected as shown below:

In the drawings, Sheet 2, FIG. 8, above the logic gates and below the shift registers, delete the reference numerals "1" and "1A" "3" and "3A" and "9" and "9A" and replace them, respectively, with --9-- and --9A--, --8-- and --8A--, and --1-- and --1A--. In the right-hand shift register block "2000" should read --1000--. Output lines "2" and "2A" and the inverter (shown in triangle) connected between lines "2" and "2A" should be deleted. Thus, FIG. 8 should be represented as appears on the following sheet:

Signed and Sealed this

Fourth Day of March 1986

[SEAL]

Attest:

DONALD J. QUIGG

Attesting Officer

Commissioner of Patents and Trademarks

UNITED STATES PATENT OFFICE
CERTIFICATE OF CORRECTION

PATENT NO. : 4,468,668

DATED : August 28, 1984

INVENTOR(S) : Lester R. Brodeur

It is certified that error appears in the above-identified patent and that said Letters Patent are hereby corrected as shown below:

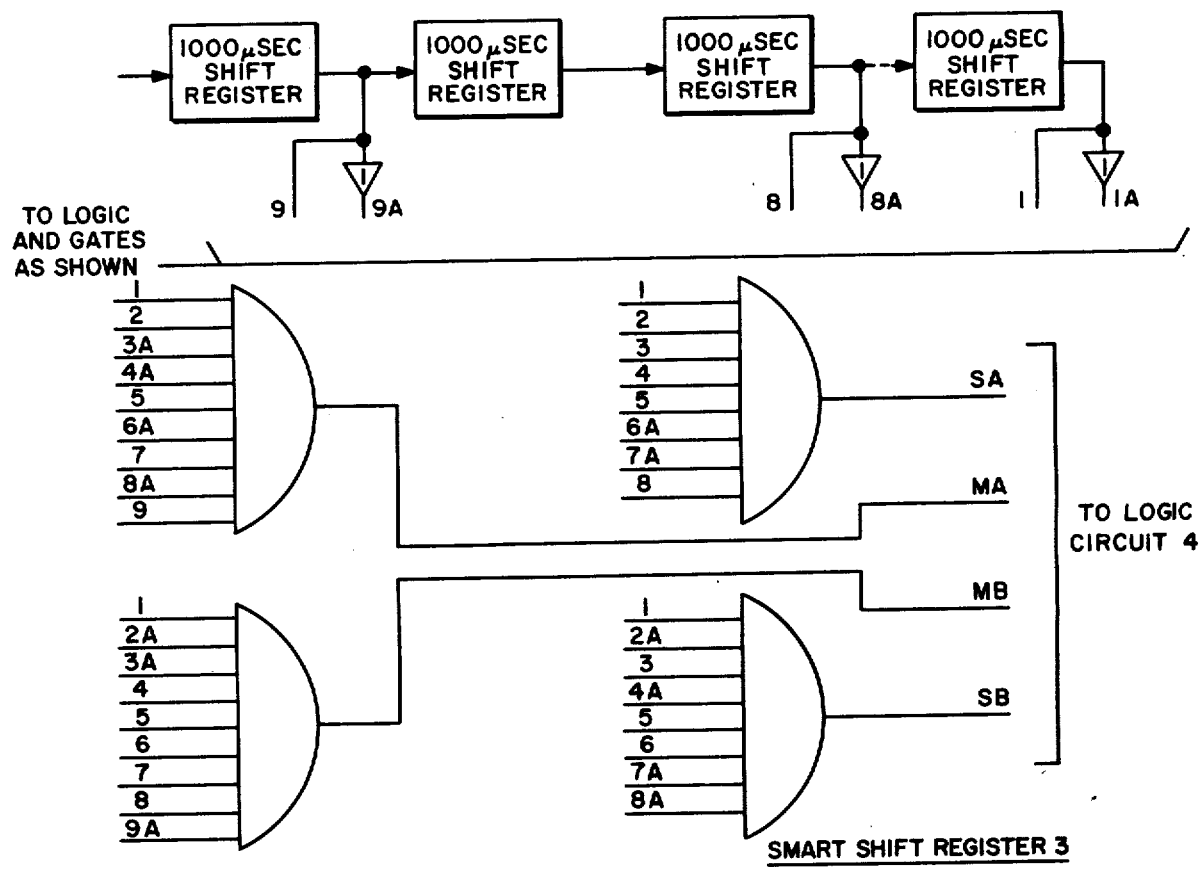

FIG. 8.